United States Patent [19]

Maruyama et al.

[11] 4,366,519

[45] Dec. 28, 1982

[54] ROTARY HEAD ASSEMBLY FOR VIDEOTAPE RECORDER OR REPRODUCER

[75] Inventors: Teruo Maruyama, Neyagawa; Masato Morimoto, Kadoma, both of Japan

[73] Assignee: Matsushita Electric Industrial Co., Ltd., Osaka, Japan

[21] Appl. No.: 168,475

[22] Filed: Jul. 14, 1980

[30] Foreign Application Priority Data

Jul. 18, 1979 [JP] Japan .................. 54-91312

[51] Int. Cl.³ .................. G11B 5/10; G11B 15/60; G11B 21/18
[52] U.S. Cl. .................. 360/129; 360/108; 360/130.24
[58] Field of Search .............. 360/129, 130.22, 130.23, 360/130.24, 84, 85, 107, 108, 124, 102, 103; 308/9

[56] References Cited

U.S. PATENT DOCUMENTS

| | | | |
|---|---|---|---|
| 3,981,024 | 9/1976 | Mo | 360/102 |
| 4,031,558 | 6/1977 | Kusaka | 360/108 |
| 4,043,612 | 8/1977 | Orcutt | 360/129 |
| 4,301,487 | 11/1981 | Maruyama | 360/130.24 |

Primary Examiner—Robert M. Kilgore
Attorney, Agent, or Firm—Burgess, Ryan and Wayne

[57] ABSTRACT

In a rotary head assembly for magnetic recording and reproducing apparatus such as VTR sets, of the type comprising a stationary shaft having its one end securely joined to a stationary member, a rotor fitted over the stationary shaft for rotation, a drive means for driving or spinning the rotor and heads mounted on the rotor, the position N of a thrust support for supporting the rotor is so selected as to coincide with the center of gravity G of the rotor or as to be located between the center of gravity G and the center of gravity $G_1$ of the rotor except an aggregate of component parts of said drive means mounted on the rotor, the center of gravity G being depending upon the center of gravity $G_1$ and the center of gravity $G_2$ of the aggregate of component parts mounted on the rotor, whereby the adverse effects of the precession of the rotor on the precision rotation or spinning thereof can be avoided.

6 Claims, 8 Drawing Figures

ROTARY HEAD ASSEMBLY FOR VIDEOTAPE RECORDER OR REPRODUCER

BACKGROUND OF THE INVENTION

The present invention relates to a rotary head assembly of a video tape recorder (to be referred as "VTR set" in this specification) and more particularly the construction of a bearing or thrust support for supporting a rapidly spinning rotor of the rotary head assembly which carries heads.

The VTR rotary head assembly must satisfy the following two stringent requirements:
 (1) Variations in rotational speed must be kept minimum; and
 (2) Longitudinal and transverse vibrations must be reduced to a minimum.

In addition, the prior art rotary head assembly of the type in which the rotor is supported by ball bearings or the like cannot satisfy the requirements for achieving a long recording and reproducing time by recording the video and sound signals at an extremely high density on the tape or for making the VTR sets, specially portable sets, compact in size and light in weight.

In order to overcome the above and other problems encountered in the prior art rotary head assembly, the use of liquid bearings has been proposed. However the following problems are present.
 (1) It is difficult to design and construct a VTR rotary head assembly which is compact in size, light in weight and inexpensive to manufacture.

The domestic electrical and electronic equipment such as VTR sets must be compact in size and light in weight and mass produced at low cost. Industrial VTR rotary head cylinders of the type using air bearings have been long used, but they must be provided with a compressed air source such as a compressor and a pneumatic control circuit which is very complex in construction. Therefore, the development of such industrial VTR rotary head assembly into domestic VTR rotary head assembly is very difficult.

In addition, the recent demand for portable VTR sets is very strong. Since the height of the portable VTR set is dependent upon that of the rotary head assembly used, there is a strong demand for a VTR rotary head assembly which is compact in size and light in weight.
 (2) It is difficult to design and construct a liquid bearing to seal a lubricant for a long time and to ensure the precision rotation of the rotor of the rotary head assembly.

In the case of machine tools, the lubricating oil can be exchanged or supplemented at any time, but in the case of the domestic electronic or electrical appliances or equipment such as VTR sets, the lubricating oil must be completely sealed so as to avoid the necessity of relubrication.
 (3) The liquid bearing must ensure the precision rotation of the rotor over a long period.
 (4) Furthermore, the trend toward the high-density recording requires that the rotor must spin very rapidly at a further higher degree of accuracy. In addition, it is preferable that the rotor can be spun with low resistant torque.

SUMMARY OF THE INVENTION

In view of the above, the primary object of the present invention is to solve the above and other problems encountered when attempts are made to use the liquid bearings in VTR rotary head assemblies.

Another object of the present invention is to provide a VTR rotary head assembly in which a rotor can spin very rapidly at a higher degree of accuracy unattainable by any prior art VTR rotary head assemblies.

In brief, according to the present invention, a rotating sleeve with one end of its bore completely liquid-tightly sealed is fitted over and supported by a stationary shaft through liquid bearings, one end of the stationary shaft being securely joined to a base. Provided at the free end of the stationary shaft is a thrust support which supports a rotor and is the center of rotation thereof. The position of the thrust support is so selected as to coincide exactly or almost exactly with the center of gravity of the rotor, whereby the precession of the rotor can be minimized.

A further object of the present invention is to provide a VTR rotary head assembly which can be driven with low torque or whose electric power consumption is less and which is very compact in size and light in weight yet highly reliable and dependable in operation.

DESCRIPTION OF THE PREFERRED EMBODIMENTS

Figure 1:
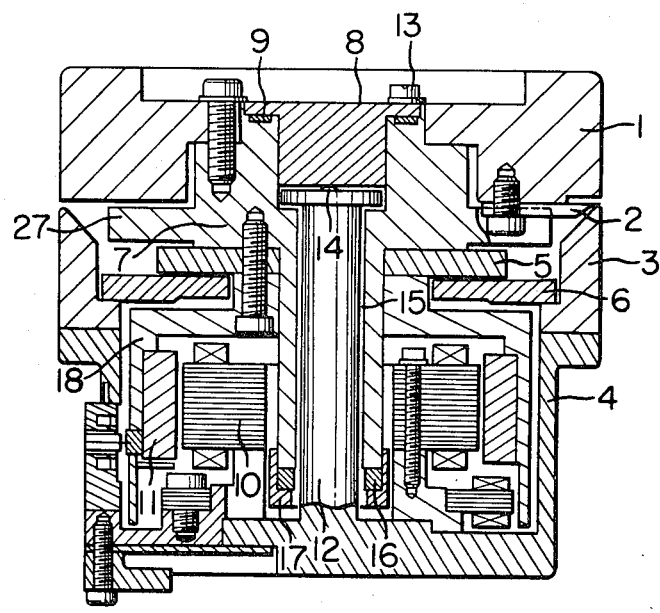
FIG. 1 is a longitudinal sectional view of a preferred embodiment of a VTR rotary head assembly in accordance with the present invention.

In FIG. 1 is shown in vertical section a preferred embodiment of a VTR's cylinder of the VTR in accordance with the present invention, in which the distance between the center of gravity of a rotor and the center of rotation thereof; that is, the point at which the rotor is supported is made as close as possible; and the center of rotation is located almost at the same height as the heads carried by the rotor, whereby the precession of the rotor can be minimized.

A rotary head assembly shown in FIG. 1 has a rotary head consisting of an upper cylinder 1 and heads 2 mounted on it. A lower cylinder 3 is securely mounted on a lower housing 4 which serves as a base. A contactless rotary transformer which transmits the signal from the heads 2, which revolve as will be described in detail below, to a VTR circuit which is stationary, consists of a rotating member 5 and a stationary member 6. The upper cylinder 1 is mounted on a rotating sleeve 7 in such a way that the upper cylinder 1 can be removed therefrom upwards. A cap 8 with a mounting flange is inserted into the bore of the rotating sleeve 7 to close the upper end thereof and bolted to the upper end of the rotating sleeve 7 with bolts 13.

The rotary head assembly further includes a direct-drive motor consisting of a stator 10 and a magnet 11 which is a rotor and is mounted in a magnet case 18, the motor driving a rotating subassembly consisting of the upper cylinder 1, the rotating sleeve 7, the rotor 11 and the magnet case 18.

A center shaft 12 which is securely attached to the lower housing 4 is provided with spiral grooves or a spiral-groove bearing (not shown) so that the oil whirls can be prevented which are a peculiar phenomenon to a liquid bearing causing instable rotation of the rotating subassembly.

A semispherical pivot bearing; that is, a thrust support 14, is extended from the upper end of the center shaft 12 for supporting the rotating subassembly. The pivot bearing or thrust support 14 is, therefore, the center of rotation of the rotating subassembly. A magnetic liquid 15, which serves as a lubricant, is sealed in the space between the rotating sleeve 7 and the center shaft 12. In order to prevent the leakage of the magnetic liquid 15, an oil seal 9 is provided at the upper end of the rotating sleeve 7 while at the lower end thereof there is provided a magnetic seal consisting of a permanent magnet 16 mounted in a magnet case 17 which in turn is securely attached to the lower end of the rotating sleeve 7.

The nonuniform rotation of the rotating subassembly is caused, among other things, by (a) cogging the degree of which is dependent upon the number of poles of the direct-drive motor and (b) variations in load applied to the rotating subassembly due to the variations in travelling speed of a tape, which is wound around the rotating subassembly or the upper cylinder 1. Therefore, in order to attain the high precision rotation of the rotating subassembly, the upper cylinder 1 must have some moment of inertia Ip. To this end, a flywheel 27 is extended from the rotating sleeve 7 into the space between the upper cylinder 1 and the lower cylinder 3.

In the embodiment shown in FIG. 1, the sleeve 7, which is supported by the center shaft 12 through the liquid bearing, is driven by the motor and this liquid bearing can assure the high precision rotation of the rotating subassembly. In addition, since the liquid bearing is provided inwardly of the upper cylinder 1, the lower cylinder 3 and the stator 10 and the rotor 11 of the direct-drive motor, it can produce the oil films of high rigidity sufficient enough to carry the radial loads. Furthermore, unlike the prior art rotary head assemblies in which a rotating subassembly is supported by at least two ball bearings which are spaced apart from each other with the resultant dead space, the rotary head assembly in accordance with the present invention can be made very compact in size and light in weight.

In brief, the rotary head assembly shown in FIG. 1 has the following structural features:

(1) The liquid bearing is provided within the bore of the rotating sleeve 7 the top end of which can be completely sealed as shown, so that the lubricant or magnetic liquid 15 can be completely sealed.

(2) The pivot bearing or thrust support 14 is extended from the upper end of the center shaft 12 so that the rotating subassembly rotates about this bearing 14.

(3) The upper cylinder 1 is mounted on the rotating sleeve 7 in such a way that the former can be removed from the latter upwardly in a simple manner.

(4) The direct-drive motor is mounted at the lower end of the rotating sleeve 7.

Figure 2:
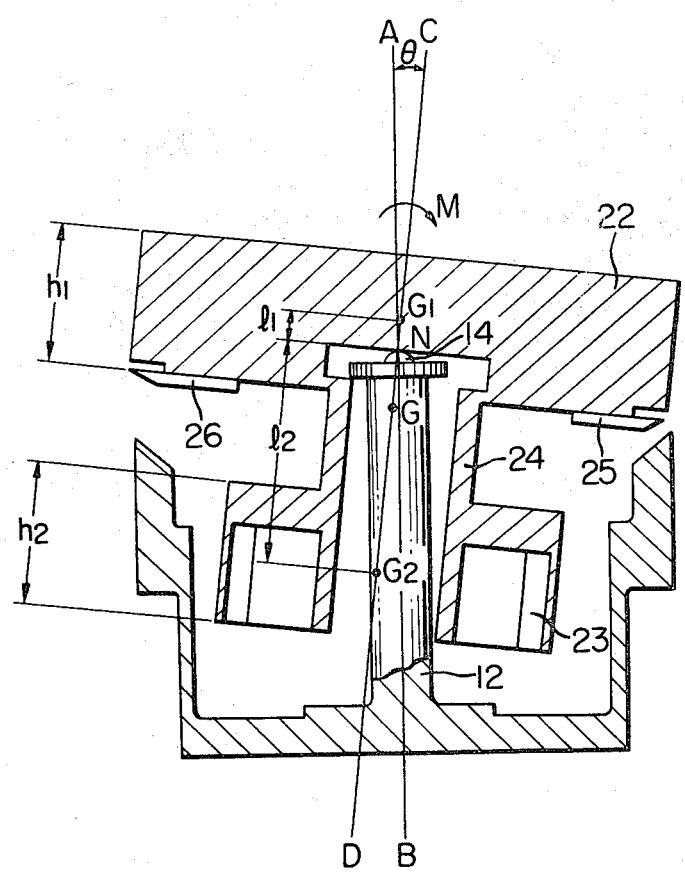
FIG. 2 shows the model thereof used for the explanation of the underlying principle of the present invention.

Next referring to the model shown in FIG. 2, the underlying principle of the present invention will be demonstrated in detail. For the sake of explanation, an aggregate consisting of the upper cylinder 1, the cap 8 and an upper portion of the rotating sleeve 7 is referred to as "the main body 22 of a rotor" which further has a sleeve portion 24 corresponding a lower portion of the rotating sleeve 7 and a motor drive 23 consisting of the rotor 11 and its case 18. The main body 22 carries two heads 25 and 26. A mark N denotes a point support for the rotor; $G_1$, the center of gravity of the main body 22; $G_2$, the center of gravity of the motor drive 23; and G, the center of gravity of the rotor. An axis AB denotes the fixed vertical axis; that is, the axis of the center shaft 12, and CD, the axis of spin of the rotor which spins very rapidly at an angular velocity $\Omega$ while precessing around the vertical axis AB at an angular velocity $\omega$.

The precision rotation of the rotor is adversely affected by the precession which occurs most likely under the following conditions or reasons:

(1) During start of the rotor, the dynamic liquid bearing cannot produce an oil film pressure sufficient to align the axis of spin CD of the rotor with the vertical axis AB. As a result, the rotor is tilted at an angle which is dependent upon the distance between the bearing surfaces of the liquid bearing. The rotor starts spinning with its axis of spin tilted relative to the vertical axis AB so that due to the centrifugal force and gyro-moment acting on it, the precession results. However, the precession can be eliminated by the restoring or righting force produced by the oil film pressure of the liquid bearing.

(2) When a VTR set is displaced while the rotor 22 is spinning, that is, during the recording or playback mode, a heavy torque impulse is applied to the rotor 22 so that the latter, which is relatively heavy in weight, is caused to misalign with the vertical axis AB. As a result, the precession results due to the centrifugal force and the gyro-moment.

(3) The precession is caused also by (a) the asymmetry of the rotor and (b) the misalignment between the axis of spin CD of the rotor and the center of rotation N. It is further caused by (c) the misalignment between the axis of the upper cylinder 1 and that of the rotating cylinder 7. This in turn is caused by a clearance between them which must be provided in order to permit the removal of the upper cylinder 1 for the replacement of the heads 26 and 27 which are worn out beyond a tolerable limit.

The precession thus caused results in the difference in height from a reference level between the two heads 25 and 26, the change in relative position between them and the variations in radius of revolution, i.e., the distance between the tip of the head 25 or 26 and the vertical axis AB. As a result, the relative velocity between the tape and the heads changes. Thus the precession of the rotor or the rotating subassembly adversely affects its rotation which must be maintained at an extremely high degree of accuracy in order to ensure the correct tracking.

As the axis of spin CD of the rotor tilts an angle $\theta$ to the vertical axis AB as best shown in FIG. 2, so does the oil film in the liquid bearing, so that the liquid bearing produces the force for restoring or righting the axis of spin CD to align with the vertical axis AB.

Part of the moment which balances with the restoring or righting moment is the gyro-moment M expressed by $$M = (Id \cdot \omega - Ip \cdot \Omega) \cdot \omega \cdot \theta \tag{I}$$

where Ip is the moment of inertia about the axis of spin CD, and Id is the moment of inertia about an axis at right angles to the axis of spin CD at the point support N.

The recessional velocity $\omega$ has a primary whirl angular velocity, which is equal to $\Omega$, and its multiples, but in general only the primary component is taken into consideration. Therefore let $\Omega = \omega$, then $$M = \omega^2 \cdot (Id - Ip) \cdot \theta \tag{II}$$

The lesser the gyro-moment M, the lesser the moment which causes the axis of spin CD to tilt relative to the vertical axis AB becomes. The magnitude is dependent upon the position of the point support N.

According to the present invention, in order that the support point N may coincide with the center of gravity G of the rotor, various parameters to be described below in TABLE I are selected, whereby the effect of the gyro-moment can be minimized.

TABLE I

| parameter | symbol | | |
|---|---|---|---|
| weight of main body 22 | $W_1$ | 210 | g |
| weight of motor drive 23 | $W_2$ | 110 | g |
| radius of main body 22 | $R_1$ | 3.1 | cm |
| outer radius of motor drive 23 | $R_2$ | 2.3 | cm |
| inner radius of motor drive 23 | $R'_2$ | 1.7 | cm |
| thickness of main body 22 | $h_1$ | 2.0 | cm |
| thickness of motor drive 23 | $h_2$ | 2.8 | cm |
| distance between $G_1$ and $G_2$ | L | 2.5 | cm |
| distance between $G_1$ and N | $l_1$ | 0.86 | cm |
| distance between N and $G_2$ | $l_2$ | 1.64 | cm |
| rotational speed | $\omega$ | 1800 | r.p.m |

In the case of the model shown in FIG. 2, $$Ip = \frac{W_1}{g} \cdot R_1^2 + \frac{W_2}{2g} \cdot R_2^2 \tag{III}$$

$$Id = \frac{W_1}{g}\left(\frac{R_1^2}{4} + \frac{h_1^2}{12}\right) + \frac{W_1}{g} \cdot l_1^2 + \frac{W_2}{g}\left(\frac{R_2^2}{4} + \frac{R_2^2}{12}\right)$$

Figure 3:
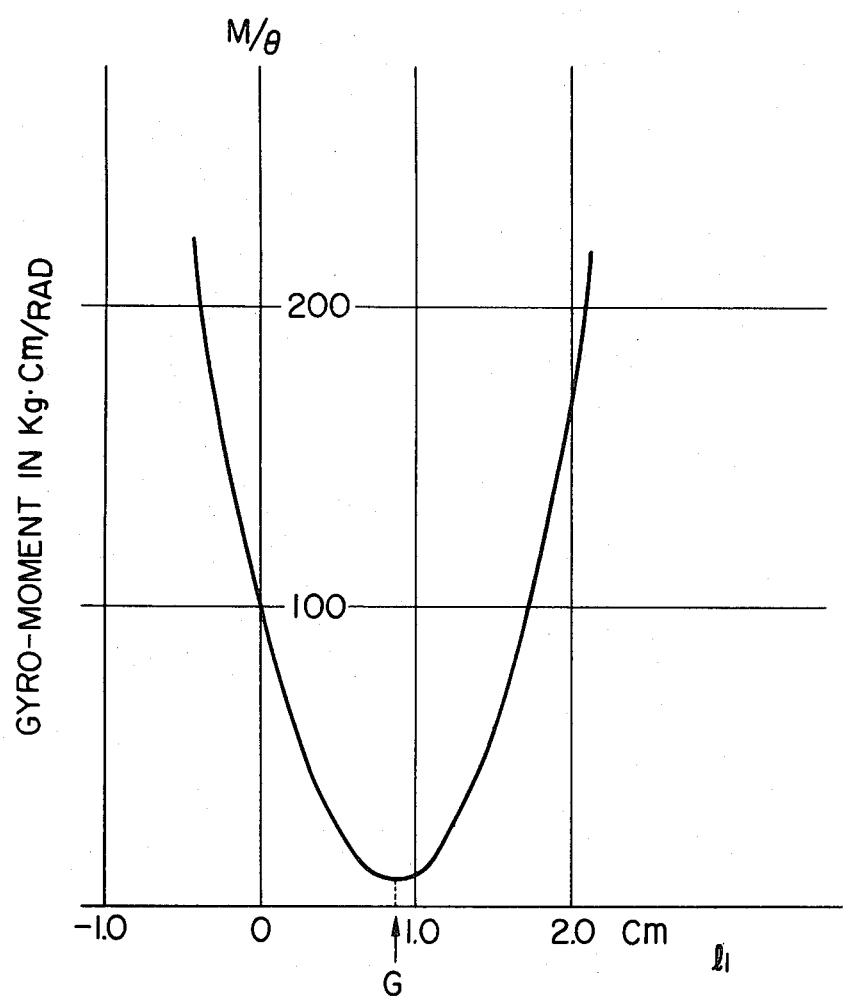
FIG. 3 is a graph showing the relationship between the position of the thrust support and the gyro-moment.

In FIG. 3 is shown the distance $l_1$ vs $M/\theta$ curve, the distance $l_1$ being measured from the center of gravity $G_1$ which remains unchanged while the position of the point support N is changed.

Substituting Id and Ip in Eq. (III) into Eq. (II), we see that $M/\theta$ has a minimum value when $$l_1 = \frac{W_2}{W_1 + W_2} \cdot L \tag{IV}$$

that is, when the point support N coincides with the center of gravity G of the rotor 22. In this case, the adverse effects of the precession on the rotation of the rotor 22 can be minimized; that is, the rotation of the rotor 22 is very stable.

Another effective measure against the precession is to increase the rigidity of the liquid bearing because the restoring or righting force can be increased. However, the increase in rigidity of the liquid bearing results in the increase in torque, so that this method is limited in the case of the portable VTR set.

The underlying principle of the present invention can be fully understood by visualizing a symmetrical spinning top having a low center of gravity which ensures the stable spinning of the top or by comparison with the dish-gyrating trick. Therefore, according to the present invention, the stable rotation or spinning of the rotor 22 can be ensured even when the rigidity of the liquid bearing is not taken into consideration.

In the first embodiment shown in FIG. 1, the point support or thrust support N is located between the center of gravity $G_1$ of the main body of the rotor 22 and the center of gravity $G_2$ of the motor drive 23, and the rotating sleeve 7 is supported by the center shaft 12 through the liquid bearing. Therefore, in order to provide the radial rigidity, the rotating sleeve 7 must be fitted over the center shaft 12 with a suitable length.

From the graph shown in FIG. 3, it is seen that it is not preferable to select the point support N below the center of gravity G of the rotor 22 because $M/\theta$ increases while the rigidity of the liquid bearing decreases. It is also seen that when the point or thrust support N is located above the center of gravity $G_1$ of the main body of the rotor 22; $M/\theta$ increases very rapidly. For instance, the distance $l_1$ is increased only by $-4$ mm from 0 in the negative direction, $M/\theta$ increases twice; that is, from 100 kg.cm to 200 kg.cm. In the case of the first embodiment shown in FIG. 1, the effective length of the engagement between the rotating sleeve 7 and the center shaft 12 is 32 mm, and even when this length is increased by 4 mm, the restoring or righting force produced by the liquid bearing for counteracting the gyro-moment will not be increased twice. Thus from the standpoint of the precession, the point or thrust support N above the center of gravity $G_1$ of the main body of the rotor 22 is not preferable. It follows, therefore, that when the point or thrust support N is located between the center of gravity $G_1$ of the main body of the rotor 22 and the center of gravity G of the rotor, the adverse effects of the precession on the precision rotation of the rotating subassembly can be minimized. When only the precession is taken into consideration, the best results can be attained when the point or thrust support N coincides exactly or almost exactly with the center of gravity G of the rotor. In this case, the decrease in rigidity of the radial liquid bearing can be compensated for by increasing only by a few millimeters the engagement length between the rotating sleeve 7 and the center shaft 12. It is, of course, very apparent that such small increase in engagement length will not interfere with the efforts for making the rotary head assembly compact in size and light in weight. In brief, according to the present invention, the rotary head assembly can be so designed and constructed that the occurence of the precession and the adverse effects thereof if it occurs can be minimized. As a result, the stiffness or rigidity of the liquid radial bearing can be decreased drastically. More specifically, even when the stiffness of the radial bearing is weak, the rotor or the rotating subassembly is almost immune to the adverse effects caused by (a) torque impulses applied to the VTR set, and (b) the nonuniform distribution of mass in the rotor, so that the high precession rotation can be ensured.

The stiffness of the radial bearing and the counter torque by the revolution of the sleeve portion counterwork with each other for the revolution of the sleeve portion. Therefore, according to the present invention, the space between the bearing surfaces of the liquid bearing is sufficiently increased and the lubricant filled in this space may have a low degree of viscosity. As a result, the present invention can provide a rotary head assembly best adapted for use in the portable VTR set because the rotor or rotating subassembly can be started and driven with a lower degree of torque, which means a low consumption of electric power.

As described above, according to the present invention, the point or thrust support N is so selected as to coincide exactly or almost exactly with the center of gravity G of the rotor or rotating subassembly. In addition, the point or thrust support N is selected almost at the same height as that of the heads 25 and 26 so that the adverse effects of the precession such as the vertical deflection $\delta_H$ of the heads can be further minimized as will be described in detail below with reference to FIG. 4. Since the vertical deflection $\delta_H$ causes the variations in radius of revolution of the heads 25 and 26 which in turn results in the variations in relative velocity between the heads 25 and 26 and the tape (not shown), the vertical deflection $\delta_H$ must be decreased to a minimum.

Figure 4:
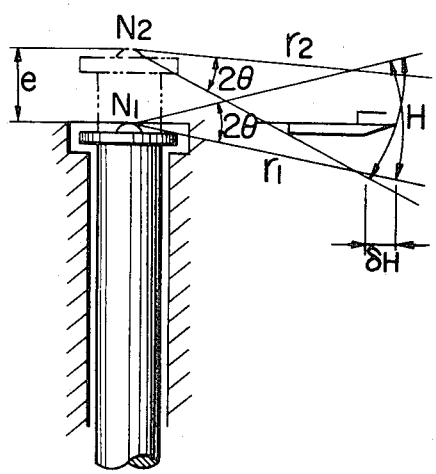
FIG. 4 is a view used for the explanation of the dependence of the vertical and horizontal deflections of a head H upon the position N of the thrust support when the precession of the rotor occurs.

Referring to FIG. 4, the first point or thrust support $N_1$ is equal in height to the head H. The second point or thrust support $N_2$ is higher than the first one by e. The distance from the first point or thrust support $N_1$ to the tip of the head H is denoted by $r_1$ while the distance between the second point or thrust support $N_2$ and the tip of the head H, by $r_2$.

Assume that the rotor is supported at $N_1$ and the axis of spin CD of the rotor is tilted through $\theta$ relative to the vertical axis AB as shown in FIG. 2 due to the precession of the rotor. Then the vertical and horizontal deflections $\delta_v$ and $\delta_H$ of the head H are expressed by $$\delta_v \approx 2 \cdot r_1 \cdot \theta$$

and $$\delta_H \approx 0 \quad\quad\quad (V)$$

However, in the case of the second point or support $N_2$, $$\delta_v \approx 2 \cdot r_2 \cdot \theta \cdot (r_1/r_2) = 2 \cdot r_1 \cdot \theta$$

and $$\delta_H \approx 2 \cdot r_2 \cdot \theta \cdot (e/r_2) = 2 \cdot \theta \cdot e \quad\quad (VI)$$

Regardless of the position of the point or thrust support, the vertical deflection $\delta_v$ is same; that is, $2 \cdot r_1 \cdot \theta$, but with the point or thrust support at $N_2$ the horizontal deflection $\delta_H$ increases from 0 to $2 \cdot \theta \cdot e$. This vertical deflection $\delta_H$ can be eliminated when the point or thrust support is located at $N_1$ which is equal in height to the head H as described above. Thus the position of the point or thrust support is very important in the present invention.

Some of the thrust supports and their associated bearings will be described with reference to FIGS. 5A through 6B. In the first embodiment, the thrust support consists of the pivot bearing or semispherical bearing 14 which makes a physical and point contact with the mating bearing surface of the rotating subassembly or the bottom surface of the cap 8 (See FIG. 1). Therefore the pivot bearing 14 is made from such a material which ensures that the wear of the pivot bearing is within a predetermined tolerable range even after a long time interval of operation. Thus the pivot bearing is the thrust support which is simplest in construction yet highly reliable and dependable in operation.

However, the recent demand for portable VTR sets is strong and consequently the high-density recording is needed. As a result, there arises a very stringent accuracy requirement that the variations in height of the head 2, 25 or 26 must be limited only to a few microns. The thrust supports to be described below with reference to FIGS. 5 and 6 can completely satisfy such requirement.

Figure 5A:
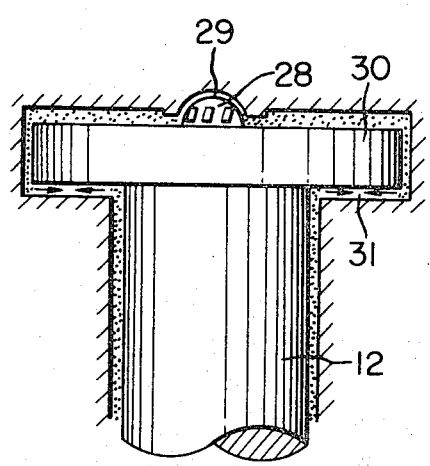
FIG. 5A is a side view of a first modification of the thrust support used in the present invention.
Figure 5B:
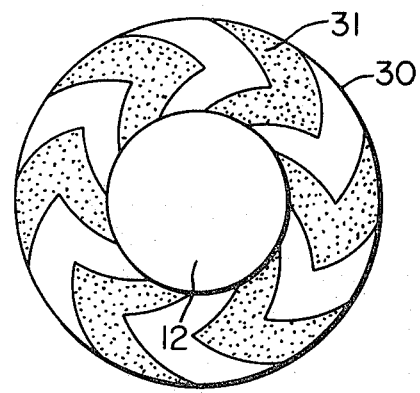
FIG. 5B shows the undersurface of a flange 30.

Referring to FIGS. 5A and 5B, the upper end of the center shaft 12 terminates into a flange 30. A semispherical, spiral-groove bearing 28 which is a thrust support and has an extremely small diameter is extended from the upper surface of the flange 30 into a semispherical recess 29 having a mating bearing surface. The undersurface of the flange 30 is formed with a plurality of herringbone-like grooves 31 as best shown in FIG. 5B.

The grooves of the spiral-groove bearing 28 are so formed that the pressure buildup is from the rim to the center. The herringbone-like groove bearing 31 at the undersurface of the flange 30 force the lubricant or magnetic liquid 15 to flow in the directions indicated by the arrows in FIG. 5A. Therefore the relative position of the rotating semiassembly to the center shaft 12; that is, the height of the head is dependent upon the eqilibrium between the pressures built up by the spiral-groove bearing 28 and the herringbone-like groove bearing 31 and the axial component of the weight of the rotating subassembly.

Because of the difference in shape or outer diameter between the spiral-groove bearings 28 and 31, their load-carrying capacities differ widely. The spiral-groove bearing 28 has a great load-carrying capacity when and only when spacing between the bearing surfaces is extremely small. However, the load-carrying capacity of the herringbone-like groove bearing 31, which capacity is relatively high, remains almost unchanged in response to the variations in spacing between the bearing surfaces. As a result, the spiral-groove bearing 28 can be maintained in very closely spaced apart relationship with the mating bearing recess 29. Thus the spiral-groove bearing 28 in the form of semisphere can support a load with the sharp edge of pressure built up in an extremely small area.

Therefore, instead of the point-contact thrust support or the pivot bearing 14 shown in FIG. 1, the bearing construction shown in FIG. 5 can be used very successfully in practice. In other words, the thrust support can have some bearing surface area.

Because of the contactless bearing construction embodying the concept of full-film lubrication, no wear will occur even after a long use so that the height of the head 2, 25 or 26 can be maintained unchanged. In addition, the effects caused by the axial component of the weight of the rotor or rotating subassembly exists can be almost eliminated. As a result, the displacement of the head in the axial direction due to the change in position of the portable VTR set can be reduced to a minimum.

Figure 6A:
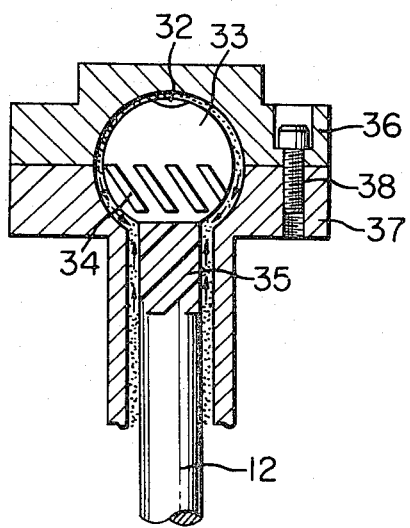
FIG. 6A is a side view of a second modification of the thrust support.
Figure 6B:
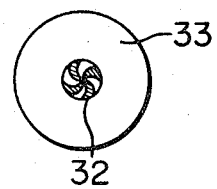
FIG. 6B is a top view of a spherical portion 33.

In FIG. 6 is shown another example of the construction of the thrust support embodying the concept of the spiral-groove bearing. The upper end of the central shaft 12 terminates into a sphere 33 at the top of which is formed a micro-spiral-groove bearing 32 as best shown in FIG. 6B. The lower half of the sphere 33 is formed with a plurality of spiral grooves which constitute a spiral-groove bearing 34 in the form of semisphere. The upper portion adjacent to the sphere 33 of the center shaft 12 is formed with a plurality of spiral grooves which constitute a spiral-groove radial journal bearing 35. The sphere portion 33 is confined in a mating spherical recess defined by upper and lower halves 36 and 37 of a housing which are bolted together with a bolt 38.

The semispherical spiral-groove bearing 34 can sustain both the radial and thrust loads. Therefore, the micro-spiral-groove bearing 32 and the semispherical spiral-groove bearing 34 carry the thrust loads while the spiral-groove bearing 34 and the spiral-groove radial journal bearing 35, the radial loads.

As compared with the semispherical spiral-groove bearing 34, the pressure built up by the micro-spiral-groove bearing 32 is very sensitive to the change in spacing between the bearing surfaces. As with the case of the thrust support construction described with reference to FIG. 5, the spherical portion 33 can be maintained in very closely spaced apart relationship with the mating spherical recess.

In the thrust support shown in FIG. 5 or 6, the semispherical spiral groove bearing 28 or the micro-spiral-groove bearing 32 is extended from the upper surface of the flange 30 or formed at the top of the spherical portion 33, but it is to be understood that they can be formed on the side of the rotor or rotating subassembly.

The herringbone-like groove bearing 31 or the semispherical spiral-groove bearing 34 is so designed and constructed that due to the pressure built up by it the spacing between the bearing surfaces of the semispherical spiral-groove bearing 28 or the micro-spiral-groove bearing 32 is reduced. Instead of the spiral-groove bearing 31 or 34, any other suitable bearing can be used which can attain the same effect. Instead of such bearing, the axial attracting force produced by the motor can be used.

Instead of projecting the semispherical micro-spiral-groove bearing 28 from the top surface of the flange 30 or forming the micro-spiral-groove bearing 32 at the top of the spherical portion 33, a small projection with the top or free end of an extremely small area can be extended from the flange 30 or the top of the spherical portion 33 and a plurality of spiral grooves can be formed in the top end of the projection.

In summary, according to the present invention, in the rotary head assembly comprising a shaft one end of which is securely joined to a stationary member, a rotor or rotating subassembly fitted over said shaft for rotation, a drive means for driving or spinning the rotor or rotating subassembly, and heads mounted on the rotor or rotating subassembly, the position N of the thrust support for supporting the rotor or rotating subassembly on the side of the free end of the stationary shaft is so selected as to coincide with the center of gravity G of the rotor or rotating subassembly or to be located between the center of gravity G and the center of gravity $G_1$ of the main body of the rotor 22 or rotating subassembly, the center of gravity G being depending upon the center of gravity $G_1$ and the center of gravity $G_2$ of an aggregate 23 of component parts of the drive means which are mounted on the rotor. As a result, the precession of the rotor or rotating subassembly can be minimized, whereby the high precision rotation or spinning can be ensured. In addition, the rotor or rotating subassembly can be driven or spun with a low rotating torque.

What is claimed is:

1. A rotary head assembly for a video tape recorder or reproducer, comprising:
   a stationary member;
   a stationary shaft having a fixed end secured to said stationary member and a free end comprising a thrust bearing;
   a rotating body comprising:
   (a) a rotary sleeve surrounding and coaxial with said stationary shaft, and disposed for rotation about the axis of said shaft;
   (b) an upper cylinder secured to said rotary sleeve;
   (c) at least one transducer head secured to said upper cylinder; and
   (d) drive means for rotating said rotary sleeve, upper cylinder and transducer head;
   said thrust bearing supporting said rotating body at a point substantially coinciding with the center of gravity of said rotating body.

2. The rotary head assembly according to claim 1, wherein said thrust bearing supporting point is axially disposed between the composite center of gravity of said rotary sleeve, upper cylinder and transducer head and the center of gravity of said drive means.

3. The rotary head assembly of claim 1, wherein said rotating body is supported by a liquid or hydraulic bearing comprising said thrust bearing.

4. The rotary head assembly according to claim 1, wherein said transducer head and said thrust bearing lie in substantially the same plane perpendicular to the axis of said shaft.

5. The rotary head assembly according to claim 3, wherein said bearing comprises a plurality of grooves in the free end of said shaft or the adjacent part of said rotating body.

6. The rotary head assembly according to claim 5, wherein said bearing is a spherical or semi-spherical spiral-groove bearing.

* * * * *